US011301072B2

(12) United States Patent
Hsiao et al.

(10) Patent No.: US 11,301,072 B2
(45) Date of Patent: *Apr. 12, 2022

(54) DRIVING CIRCUIT, A METHOD FOR DRIVING A DISPLAY PANEL HAVING A TOUCH PANEL, AND A DISPLAY APPARATUS

(71) Applicant: Novatek Microelectronics Corp., Hsinchu (TW)

(72) Inventors: Sheng-Wen Hsiao, Changhua County (TW); Liang-Chi Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,375

(22) Filed: Aug. 24, 2020

(65) Prior Publication Data
US 2020/0387250 A1 Dec. 10, 2020

Related U.S. Application Data

(63) Continuation of application No. 15/086,073, filed on Mar. 31, 2016, now Pat. No. 10,809,855.
(Continued)

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/041* (2013.01); *G06F 3/044* (2013.01); *G06F 3/0416* (2013.01);
(Continued)

(58) Field of Classification Search
CPC .... G06F 3/0412; G06F 3/04166; G06F 3/044; G06F 3/041; G06F 3/04186;
(Continued)

(56) References Cited

U.S. PATENT DOCUMENTS 7,859,521 B2 * 12/2010 Hotelling ............ G06F 3/04166
345/173
9,298,329 B2 * 3/2016 Kim ...................... G06F 3/0443
(Continued)

*Primary Examiner* — Dismery Mercedes
(74) *Attorney, Agent, or Firm* — JCIPRNET

(57) ABSTRACT

A driving circuit configured to drive a display panel having a touch panel is provided. The driving circuit modulates a plurality of first voltage signals on a plurality of different first signals and provides the modulated first signals to the gate control circuit on the display panel. A plurality of gate lines of the display panel are driven according to the modulated first signals during a sensing period. The driving circuit modulates a plurality of second voltage signals on a second signal. The sensor pads of the touch panel are driven according to the modulated second signal during the sensing period. The driving circuit modulates a plurality of third voltage signals on a third signal and provides the modulated third signal to non-active sensor pads during the sensing period. A method for driving a display panel having a touch panel and a display apparatus are also provided.

15 Claims, 7 Drawing Sheets

Related U.S. Application Data

(60) Provisional application No. 62/207,366, filed on Aug. 19, 2015.

(51) Int. Cl.
*G09G 3/20* (2006.01)
*G09G 3/36* (2006.01)

(52) U.S. Cl.
CPC ........ *G06F 3/0446* (2019.05); *G06F 3/04164* (2019.05); *G06F 3/04166* (2019.05); *G09G 3/20* (2013.01); *G09G 3/3688* (2013.01)

(58) Field of Classification Search
CPC .... G06F 3/0446; G06F 3/0447; G06F 3/0443; G06F 3/0416; G06F 3/04162; G06F 3/03547; G06F 3/03545; G06F 3/04164; G06F 3/041662; G06F 2203/04104; G06F 2203/04111; G06F 2203/04105; G06F 2203/04114; G06F 3/0445; G06F 3/04184; G09G 2354/00; G09G 2300/0426; G09G 3/3688; G09G 3/3275; G09G 3/3266; G09G 3/3648; G09G 2310/0264; G09G 2310/0297; G09G 2310/067; G02F 1/13338

See application file for complete search history.

(56) References Cited

U.S. PATENT DOCUMENTS

| | | | | |
|---|---|---|---|---|
| 9,348,476 B2* | 5/2016 | Lee | ............... | G06F 3/04164 |
| 9,715,304 B2* | 7/2017 | Berget | ............... | G06F 3/0443 |
| 9,778,713 B2* | 10/2017 | Reynolds | ............... | G06F 3/0446 |
| 9,910,333 B2* | 3/2018 | Shin | ............... | G06F 3/0412 |
| 10,795,471 B2* | 10/2020 | Reynolds | ............... | G06F 3/045 |
| 2007/0242024 A1* | 10/2007 | Sung | ............... | G09G 3/3688 345/100 |
| 2010/0194697 A1* | 8/2010 | Hotelling | ............... | G06F 3/0446 345/173 |
| 2013/0088470 A1* | 4/2013 | Chang | ............... | G09G 3/3655 345/208 |
| 2014/0253498 A1* | 9/2014 | Suzuki | ............... | G06F 3/04166 345/174 |
| 2015/0185936 A1* | 7/2015 | Kim | ............... | G06F 3/04166 345/174 |
| 2015/0220206 A1* | 8/2015 | Knausz | ............... | G06F 3/0446 345/174 |
| 2016/0313823 A1* | 10/2016 | Tan | ............... | G06F 3/0445 |
| 2016/0334934 A1* | 11/2016 | Mo | ............... | G06F 3/0412 |

* cited by examiner

DRIVING CIRCUIT, A METHOD FOR DRIVING A DISPLAY PANEL HAVING A TOUCH PANEL, AND A DISPLAY APPARATUS

CROSS-REFERENCE TO RELATED APPLICATION

This application is a continuation application of and claims the priority benefit of a prior application Ser. No. 15/086,073, filed on Mar. 31, 2016. The prior application Ser. No. 15/086,073 claims the priority benefits of U.S. provisional application Ser. No. 62/207,366, filed on Aug. 19, 2015. The entirety of the above-mentioned patent application is hereby incorporated by reference herein and made a part of this specification.

BACKGROUND OF THE INVENTION

1. Field of the Invention

The invention generally relates to an electronic circuit and a method for driving an apparatus, in particular, to a driving circuit and a method for driving a display panel having a touch panel.

2. Description of Related Art

In this information era, reliance on electronic products is increasing day by day. The electronic products including notebook computers, mobile phones, personal digital assistants (PDAs), digital walkmans, and so on are indispensable in our daily lives. Each of the aforesaid electronic products has an input interface for a user to input his or her command, such that an internal system of each of the electronic product spontaneously runs the command. At this current stage, the most common input interface includes a keyboard and a mouse.

From the user's aspect, it is sometimes rather inconvenient to use the conventional input interface including the keyboard and the mouse. Manufacturers aiming to resolve said issue thus start to equip the electronic products with touch input interfaces, e.g. touch pads or touch panels, so as to replace the conditional keyboards and mice. At present, the users' commands are frequently given to the electronic products by physical contact or sensing relationship between users' fingers or styluses and the touch input interfaces. For instance, a capacitive touch input interface characterized by a multi-touch sensing function is more user-friendly than the conventional input interface and thus gradually becomes more and more popular.

However, when a touch panel is embedded into a display panel, parasitic capacitances may be generated therebetween. The parasitic capacitances would have an impact on touch operation and reduce display quality. Hence, how to reduce the parasitic capacitances between the touch panel and the display panel to make a display touch apparatus have satisfactory touch operation and good display quality without increasing the manufacturing costs is one of the most important topics in the pertinent field.

SUMMARY OF THE INVENTION

Accordingly, the invention is directed to a driving circuit and a method for driving a display panel having a touch panel, capable of reducing parasitic capacitances.

In an embodiment of the invention, a driving circuit configured to drive a display panel having a touch panel is provided. The driving circuit includes a signal generating circuit and a sensor driving circuit. The signal generating circuit is configured to modulate a plurality of first voltage signals on a plurality of different first signals and provide the modulated first signals to a gate control circuit on the display panel. A plurality of gate lines of the display panel are driven according to the modulated first signals during a sensing period. The sensor driving circuit is configured to modulate a plurality of second voltage signals on a second signal. One or more sensor pads of the touch panel are driven according to the modulated second signal during the sensing period. The sensor pads include a plurality of active sensor pads and a plurality of non-active sensor pads during the sensing period. The sensor driving circuit is further configured to modulate a plurality of third voltage signals on a third signal and provide the modulated third signal to the non-active sensor pads during the sensing period. The sensor driving circuit includes a plurality of modulation channels. The modulation channels coupled to the non-active sensor pads are controlled to sequentially transmit the third voltage signals to the touch panel. The modulation channels coupled to the active sensor pads are controlled to transmit sensing signals to a determination circuit.

In an embodiment of the invention, a method for driving a display panel having a touch panel is provided. The display panel includes a plurality of gate lines. The touch panel includes a plurality of sensor pads. The sensor pads include a plurality of active sensor pads and a plurality of non-active sensor pads during a sensing period. The method includes: modulating a plurality of first voltage signals on a plurality of different first signals and providing the modulated first signals to a gate control circuit on the display panel; modulating a plurality of second voltage signals on a second signal; modulating a plurality of third voltage signals on a third signal and providing the modulated third signal to the non-active sensor pads during the sensing period; driving the gate lines according to the modulated first signals and driving the sensor pads according to the modulated second driving signal during the sensing period; causing a plurality of first modulation channels coupled to the non-active sensor pads to sequentially transmit the third voltage signals to the touch panel; and causing a plurality of second modulation channels coupled to the active sensor pads to transmit sensing signals to a determination circuit.

In an embodiment of the invention, a display apparatus includes a display panel and a driving circuit. The display panel includes a touch panel. The display panel includes a gate control circuit and a plurality of gate lines. The touch panel includes a plurality of sensor pads. The sensor pads include a plurality of active sensor pads and a plurality of non-active sensor pads during a sensing period. The driving circuit is configured to drive the display panel having a touch panel. The driving circuit is further configured to: modulate a plurality of first voltage signals on a plurality of different first signals and provide the modulated first signals to the gate control circuit on the display panel, wherein a plurality of gate lines of the display panel are driven according to the modulated first signals during a sensing period; modulate a plurality of second voltage signals on a second signal, wherein the sensor pads of the touch panel are driven according to the modulated second signal during the sensing period; modulate a plurality of third voltage signals on a third signal and provide the modulated third signal to the non-active sensor pads during the sensing period; cause a plurality of first modulation channels coupled to the non-active sensor pads to sequentially transmit the third voltage signals to the touch panel; and cause a plurality of second modulation channels coupled to the active sensor pads to transmit sensing signals to a determination circuit.

According to the above descriptions, the plurality of voltage signals are modulated on the first driving signal, the second driving signal and the third driving signal in exemplary embodiments. The gate lines and the sensor pads are driven by the modulated driving signals, and the data lines are controlled to be electrically floating during the sensing period. Therefore, the parasitic capacitances are reduced.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
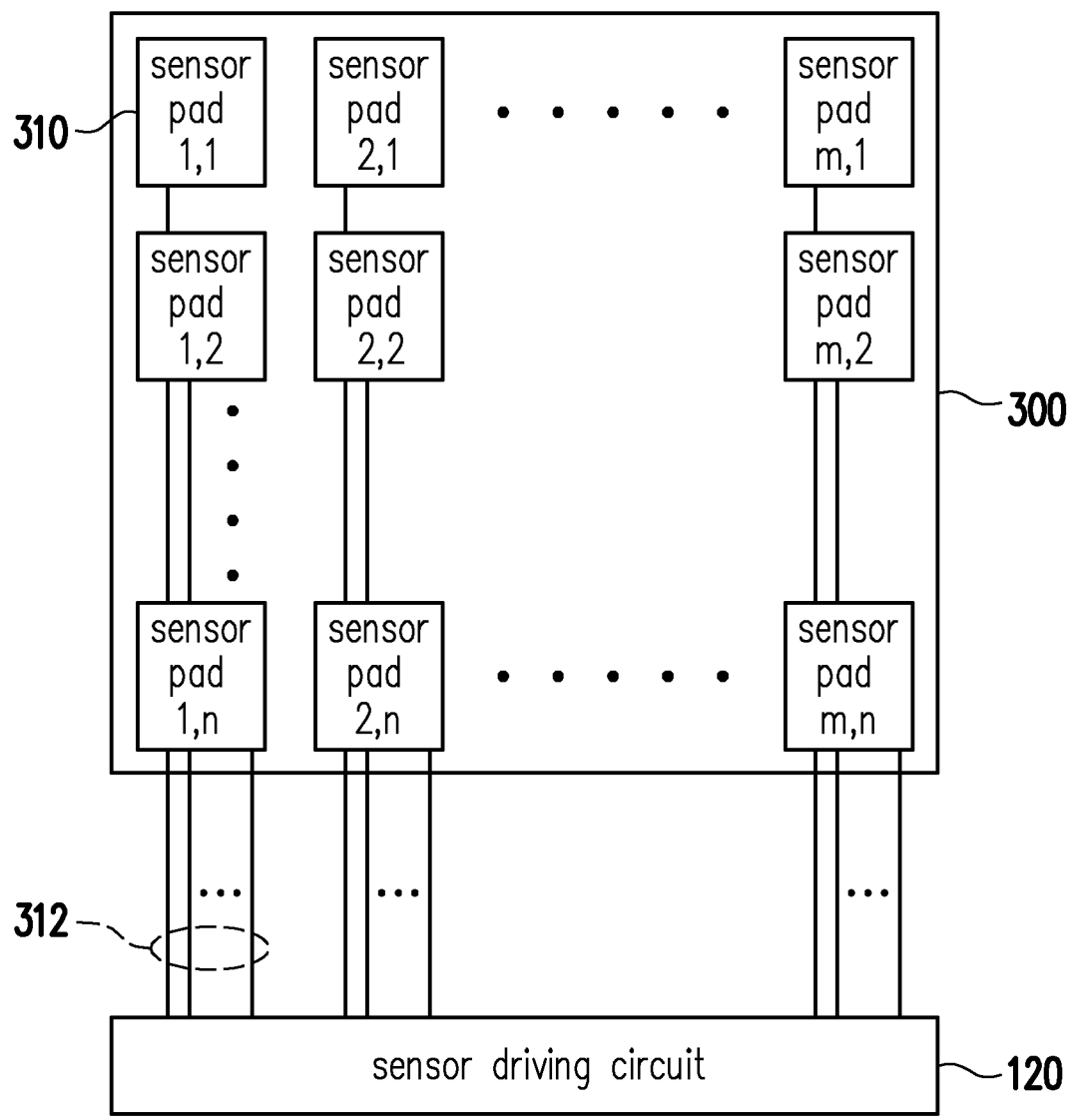
FIG. 1 illustrates a schematic diagram of a touch panel and a sensor driving circuit according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "coupling/coupled" used in this specification (including claims) of the disclosure may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 2:
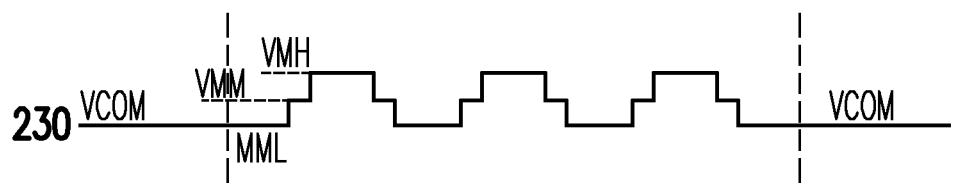
FIG. 2 illustrates a schematic waveform of a signal for driving sensor pads according to an embodiment of the invention.

FIG. 1 illustrates a schematic diagram of a touch panel and a sensor driving circuit according to an embodiment of the invention. FIG. 2 illustrates a schematic waveform of a signal for driving sensor pads according to an embodiment of the invention. Referring to FIG. 1 and FIG. 2, a touch panel 300 of the present embodiment includes a plurality of sensor pads 310. The sensor pads 310 are arranged in an array. A sensor driving circuit 120 is coupled to the sensor pads 310. The sensor driving circuit 120 drives the sensor pads 310 with a modulated driving signal as illustrated in FIG. 2 during a sensing period in the present embodiment.

To be specific, a whole common electrode of a display panel is divided into the plurality of sensor pads 310 in the present embodiment. In a display period, the sensor pads 310 serve as common electrodes. In the sensing period, the sensor pads 310 serve as sensor electrodes. The sensor driving circuit 120 modulates voltage signals VML, VMM and VMH on a driving signal VCOM to generate the modulated driving signal as illustrated in FIG. 2. In the present embodiment, the driving signal VCOM may be a signal applied to the common electrodes in the display period. When the sensor pads 310 serve as the sensor electrodes in the sensing period, the sensor driving circuit 120 drives the sensor pads 310 with the modulated driving signal 230 via sensor trace 312. Next, an analog-front-end (AFE) circuit calculates capacitive variations of each of the sensor pads 310 relative to ground, so as to determine whether a touch event happens.

In the present embodiment, the touch panel 300 may be embedded into the display panel in a manner of in-cell or on-cell, and the invention is not limited thereto. Enough teaching, suggestion, and implementation illustration for the aforesaid touch panel may be obtained with reference to common knowledge in the related art, which is not repeated hereinafter.

Figure 3:
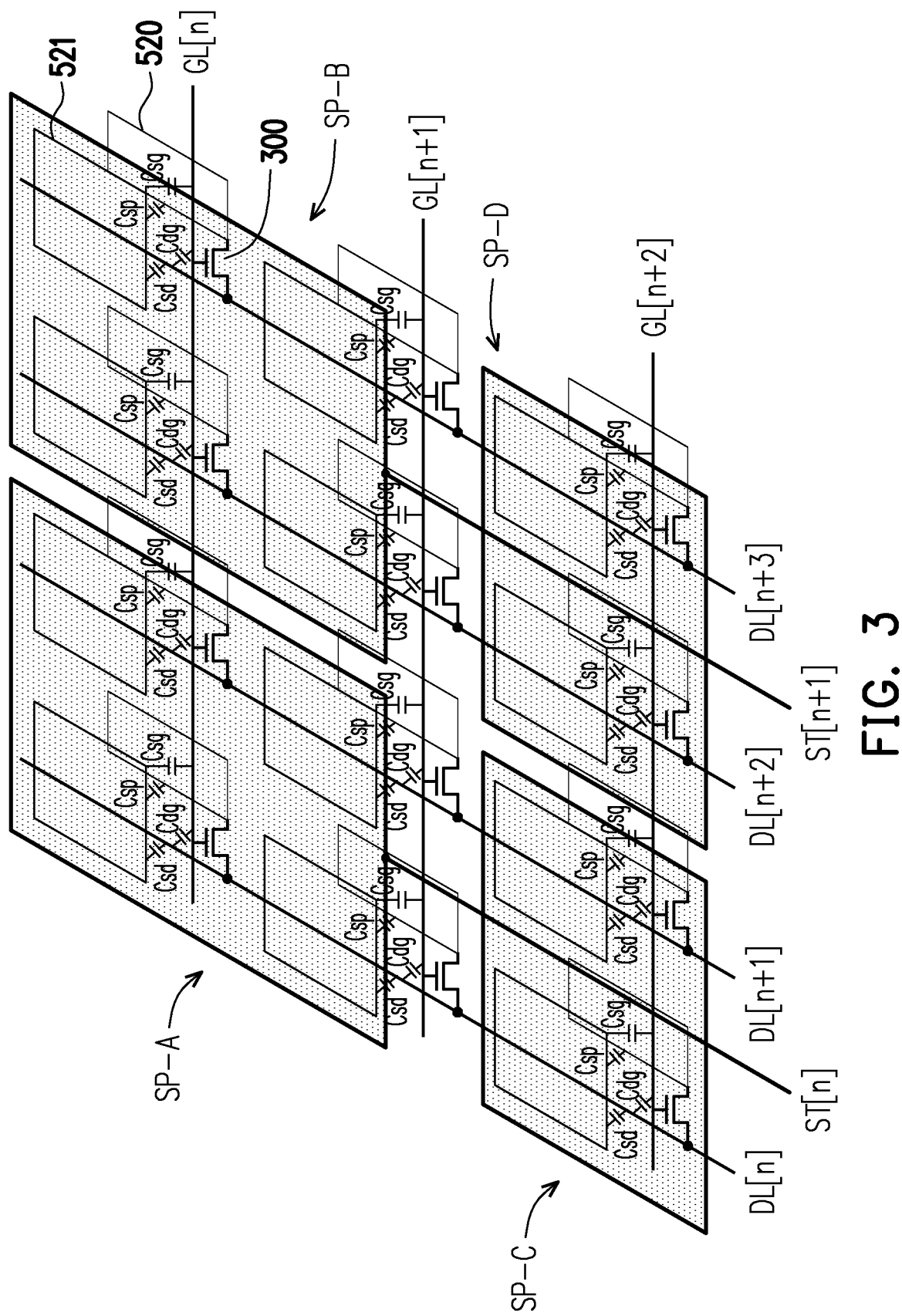
FIG. 3 illustrates a schematic diagram of parasitic capacitances between sensor electrodes and panel elements according to an embodiment of the invention.

FIG. 3 illustrates a schematic diagram of parasitic capacitances between sensor electrodes and panel elements according to an embodiment of the invention. Referring to FIG. 3, sensor pads SP-A, SP-B, SP-C and SP-D are disposed above a plurality of data lines DL[n] to DL[n+3], a plurality of gate lines GL[n] to GL[n+2], and a plurality of pixel electrodes 520, where n is an integer large than or equal to 1. Each of the sensor pads SP-A, SP-B, SP-C and SP-D includes a plurality of sub-common electrodes 521 in the present embodiment. The plurality of sub-common electrodes 521 are electrically connected to form a single sensor pad, e.g. the sensor pad SP-A, SP-B, SP-C or SP-D. In addition, sensor trances ST[n] and ST[n+1] connects the sensor pads SP-A, SP-B, SP-C and SP-D and a sensor driving circuit. In the present embodiment, parasitic capacitances Csd, Cdg, Csg and Csp may be generated among the sensor electrodes and the panel elements. For example, the parasitic capacitance Csd may be generated between the sensor electrode and the data line, the parasitic capacitance Cdg may be generated between the data line and the gate line, the parasitic capacitance Csg may be generated between the sensor electrode and the gate line, and the parasitic capacitance Csp may be generated between the sensor electrode and the pixel electrode.

Figure 4:
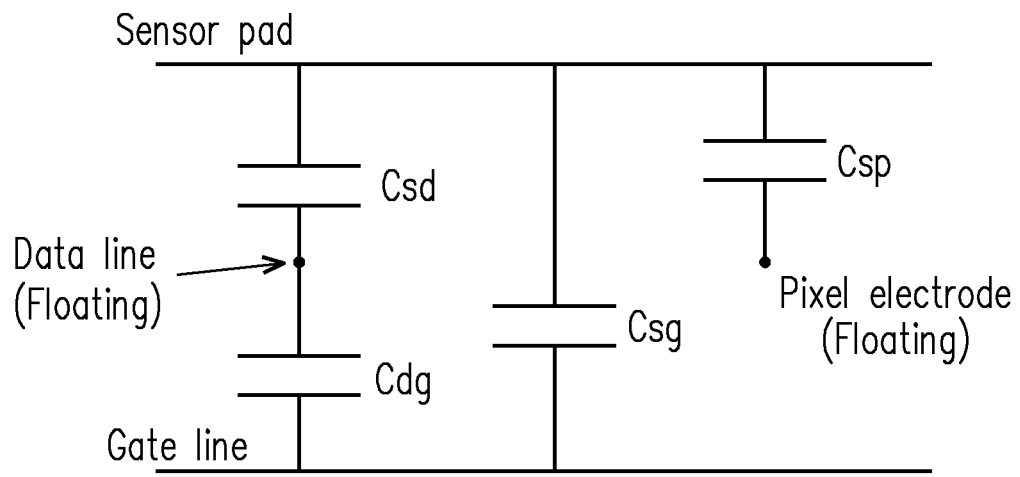
FIG. 4 illustrates an equivalent circuit diagram of the parasitic capacitances depicted in FIG. 3.
Figure 5:
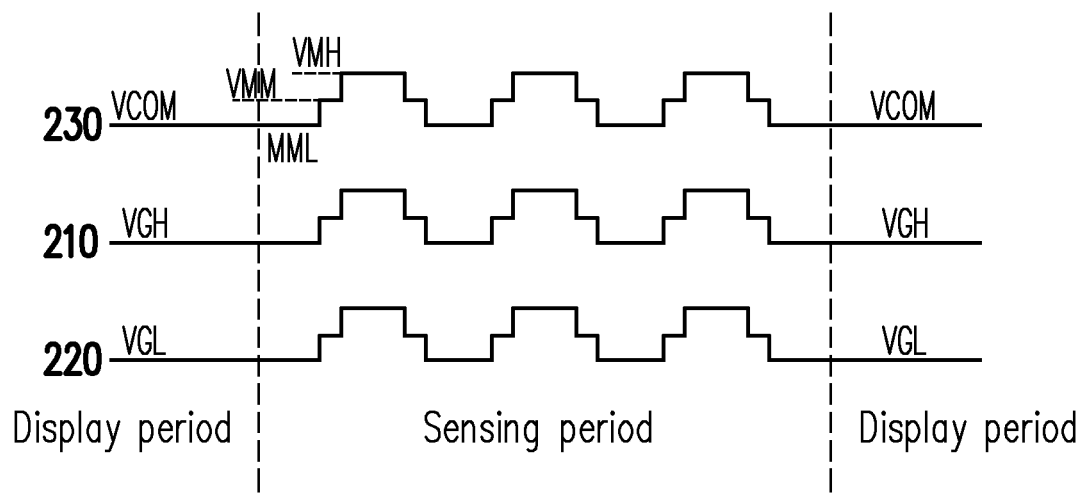
FIG. 5 illustrates schematic waveforms of signals for driving sensor pads and panel elements according to an embodiment of the invention.

FIG. 4 illustrates an equivalent circuit diagram of the parasitic capacitances depicted in FIG. 3. FIG. 5 illustrates schematic waveforms of signals for driving sensor pads and panel elements according to an embodiment of the invention. Referring to FIG. 1, FIG. 4 and FIG. 5, the parasitic capacitances Csd and Cdg are coupled in series in the present embodiment. When the sensor driving circuit 120 drives the sensor pads 310 with the modulated third driving signal 230 via the sensor trace 312, the data lines, e.g. DL[n] to DL[n+3], are controlled to be electrically floating during the sensing period. In the present embodiment, the pixel electrodes 520 may also be controlled to be electrically floating during the sensing period. At the same time, a first driving signal VGH and a second driving signal VGL are modulated with the voltage signals VML, VMM and VMH to generate the modulated first driving signal 210 and the modulated second driving signal 220, respectively. The gate lines, e.g. GL[n] to GL[n+2], are driven by the modulated first driving signal 210 and the modulated second driving signal 220 during the sensing period. In the present embodiment, the first driving signal VGH and the second driving signal VGL may be signals that are respectively applied to a VGH power line and a VGL power line in the display period.

In the present embodiment, the waveforms of the modulated first driving signal 210, the modulated second driving signal 220, and the modulated third driving signal 230 are substantially identical as shown in FIG. 5. For example, during the sensing period, each of the modulated first driving signal 210, the modulated second driving signal 220, and the modulated third driving signal 230 may have a plurality of step waveforms located in corresponding timing. In the present embodiment, since the data lines are electrically floating, and the waveforms of the first driving signal VGH and the second driving signal VGL are modulated to be similar to that of the third driving signal VCOM during the sensing period, the parasitic capacitances Csd and Cdg are effectively reduced. In the present embodiment, voltage levels of the first driving signal VGH, the second driving signal VGL and the third driving signal VCOM may be the same or different according to design requirements, and the invention is not limited thereto.

Figure 6:
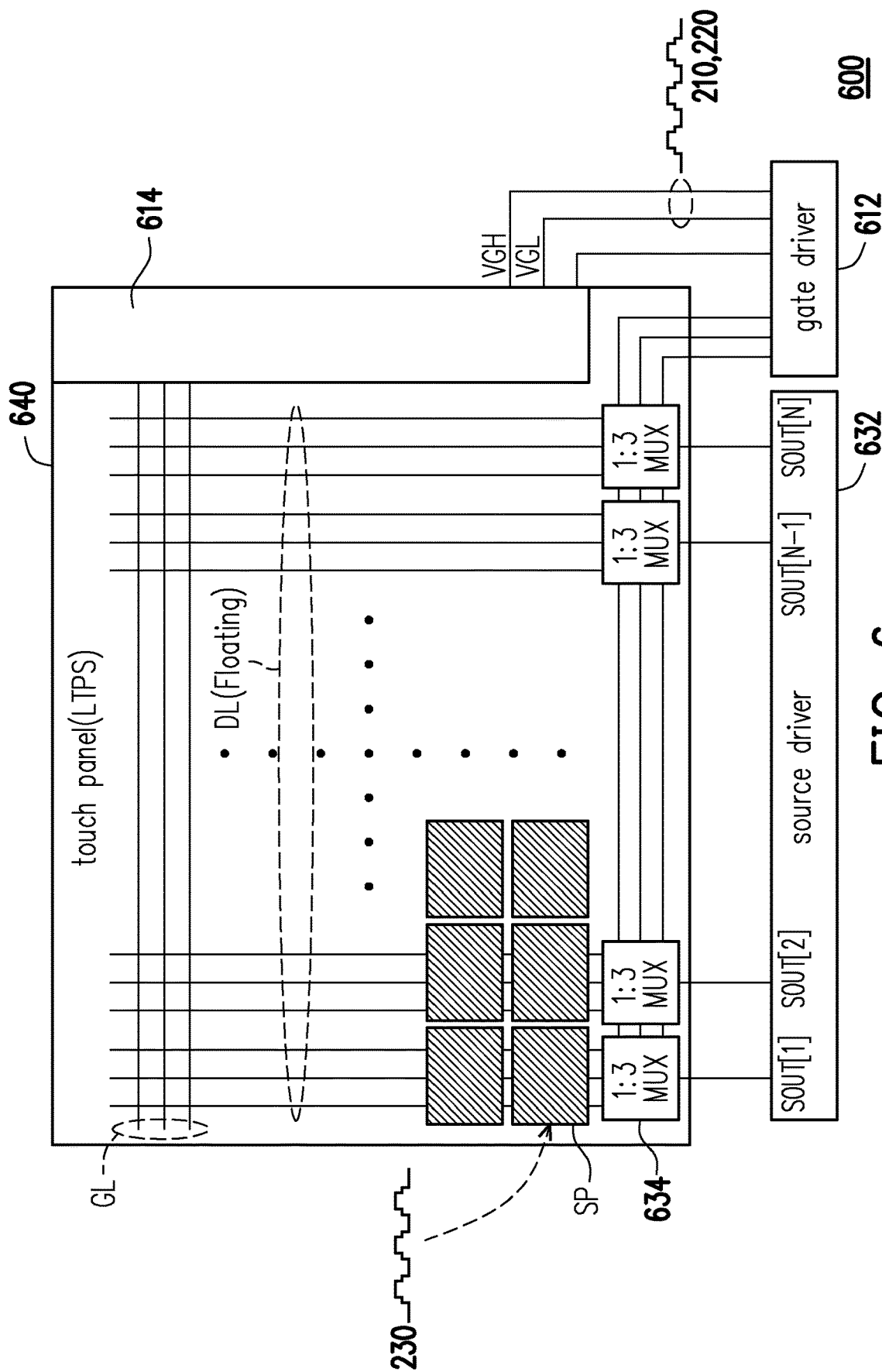
FIG. 6 illustrates a schematic diagram of a display touch apparatus having a low temperature poly-silicon (LIPS) touch panel according to an embodiment of the invention.

FIG. 6 illustrates a schematic diagram of a display touch apparatus having a low temperature poly-silicon (LIPS) touch panel according to an embodiment of the invention. Referring to FIG. 6, data lines DL are controlled by multiplexer circuits 634 on a LIPS touch panel 640, and gate lines GL are controlled by a gate control circuit 614 in the present embodiment. Operation voltages and control/driving signals of the multiplexer circuits 634 and the gate control circuit 614 are provided by an external gate driver 612. The gate driver 612 is arranged out of the LIPS touch panel 640. The gate driver 612 controls the multiplexer circuits 634 located on the LIPS touch panel 640 to turn off the output of the multiplexer circuits 634 during the sensing period, and thus the data lines DL are floating in the present embodiment. In one embodiment, the outputs SOUT[1] to SOUT[N] of the source driver 632 may be coupled to the data lines DL via a switch circuit, and the switch circuit is controlled to make the data lines DL electrically floating by a control signal during the sensing period, where N is an integer large than or equal to 4. In the present embodiment, the gate driver 612 also controls the output of the gate control circuit 614 located on the LIPS touch panel 640 to turn off the gate terminals of the thin film transistors, e.g. 300 depicted in FIG. 3, during the sensing period, and thus the pixel electrodes, e.g. 520 depicted in FIG. 3, are floating in the present embodiment. In the present embodiment, the waveforms of the first driving signal VGH and the second driving signal VGL are modulated to be similar to that of the third driving signal VCOM during the sensing period as illustrated in FIG. 5, and thus the parasitic capacitances Csd and Cdg are effectively reduced.

Figure 7:
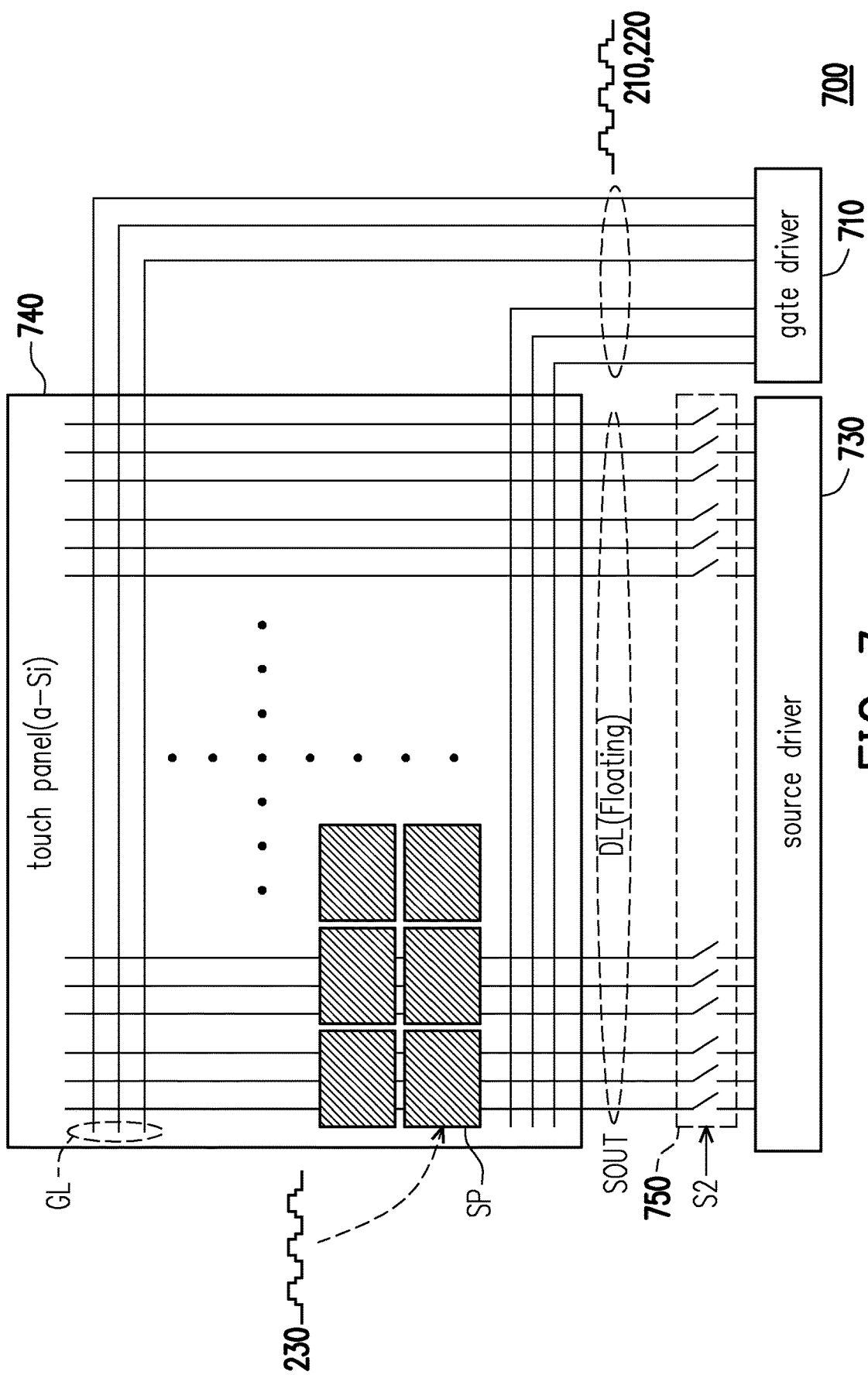
FIG. 7 illustrates a schematic diagram of a display touch apparatus having an amorphous silicon (a-Si) touch panel according to an embodiment of the invention.

FIG. 7 illustrates a schematic diagram of a display touch apparatus having an amorphous silicon (a-Si) touch panel according to an embodiment of the invention. Referring to FIG. 7, data lines DL and gate lines GL are respectively controlled by an external source driver 730 and an external gate driver 710 in the present embodiment. The source driver 730 and the gate driver 710 are arranged out of the a-Si touch panel 740. In the present embodiment, the source driver 730 is coupled to the data lines DL of the a-Si touch panel 740 via a switch circuit 750. The switch circuit 750 is controlled to electrically float the data lines DL by a control signal S2 during the sensing period. In the present embodiment, the control signal S2 may be provided by the source driver 730, the gate driver 710, a timing control circuit, or other similar circuits according to design requirements, and it is not limited in the invention. In the present embodiment, the gate driver 710 also turns off the gate terminals of the thin film transistors, e.g. 300 depicted in FIG. 3, via the gate lines GL during the sensing period, and thus the pixel electrodes, e.g. 520 depicted in FIG. 3, are floating in the present embodiment. In the present embodiment, the waveforms of the first driving signal VGH and the second driving signal VGL are modulated to be similar to that of the third driving signal VCOM during the sensing period as illustrated in FIG. 5, and thus the parasitic capacitances Csd and Cdg are effectively reduced.

Figure 8:
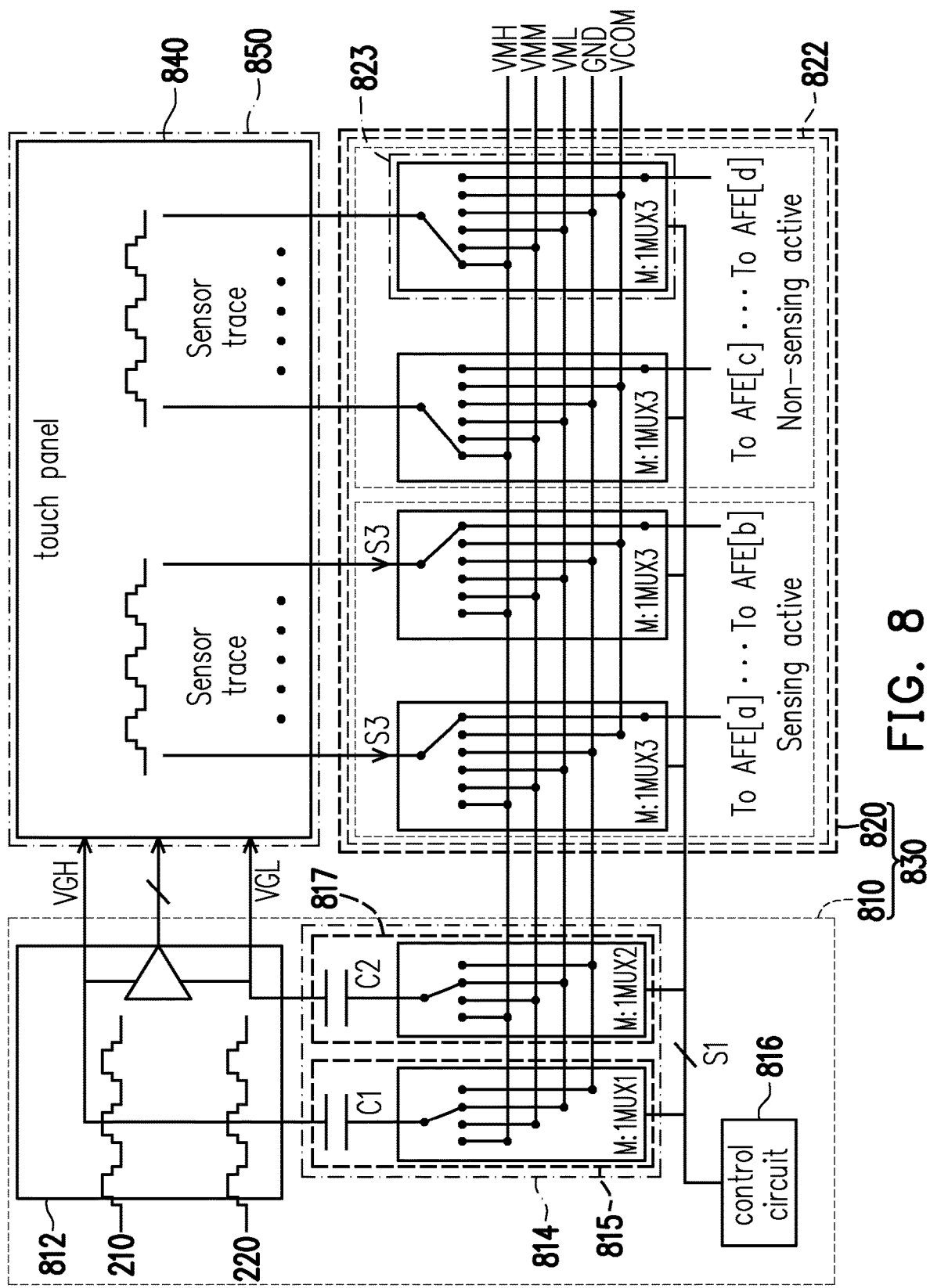
FIG. 8 illustrates a schematic diagram of a display touch apparatus according to an embodiment of the invention.

FIG. 8 illustrates a schematic diagram of a display touch apparatus according to an embodiment of the invention. Referring to FIG. 8, the display touch apparatus 800 of the present embodiment includes a driving circuit 830 and a display panel 850. The display panel 850 includes a touch panel 840. The driving circuit 830 is configured to drive the display panel 850. The driving circuit 830 includes a signal generating circuit 810 and a sensor driving circuit 820. In the present embodiment, the signal generating circuit 810 modulates a plurality of voltage signals VML, VMM and VMH on a first driving signal VGH and a second driving signal VGL, and drives the gate lines, e.g. GL depicted in FIG. 6 or FIG. 7, with the modulated first driving signal 210 and the modulated second driving signal 220 during a sensing period. In the present embodiment, the sensor driving circuit 820 modulates the voltage signals VML, VMM and VMH on a third driving signal VCOM, and drives the sensor pads, e.g. SP depicted in FIG. 6 or FIG. 7, with the modulated third driving signal 230 during the sensing period. In the present embodiment, the data lines, e.g. DL depicted in FIG. 6 or FIG. 7, are controlled to be electrically floating during the sensing period, and waveforms of the modulated first driving signal 210, the modulated second driving signal 220, and the modulated third driving signal 230 are substantially identical. In addition, the voltage signals VML, VMM and VMH and the driving signals VGH, VGL, VCOM and GND may be provided by a power generator circuit (not shown) in the present embodiment.

To be specific, the signal generating circuit 810 includes a gate driver circuit 812, a first signal modulation circuit 814, and a control circuit 816 in the present embodiment. The gate driver circuit 812 is coupled to the gate lines. The gate driver circuit 812 operates between the modulated first driving signal 210 and the modulated second driving signal 220 during the sensing period, and outputs the modulated first driving signal 210 and the modulated second driving signal 220 to the coupled gate lines. The first signal modulation circuit 814 is coupled to the gate driver circuit 812.

The first signal modulation circuit 814 receives the voltage signals VML, VMM and VMH, and modulates the voltage signals VML, VMM and VMH on the first driving signal VGH and the second driving signal VGL.

In the present embodiment, the first signal modulation circuit 814 includes a first modulation channel 815 and a second modulation channel 817. The first modulation channel 815 receives the voltage signals VML, VMM and VMH, and modulates the voltage signals VML, VMM and VMH on the first driving signal VGH. The second modulation channel 817 receives the voltage signals VML, VMM and VMH, and modulates the voltage signals VML, VMM and VMH on the second driving signal VGL. In the present embodiment, each of the first modulation channel 815 and the second modulation channel 817 includes a capacitor and a multiplexer circuit. Taking the first modulation channel 815 for example, the capacitor C1 is coupled to the gate driver circuit 812. The capacitor C1 modulates the voltage signals VML, VMM and VMH on the first driving signal VGH. The multiplexer circuit MUX1 is coupled to the gate driver circuit 812 via the capacitor C1. The multiplexer circuit MUX1 is controlled to sequentially transmit the voltage signals VML, VMM and VMH to the capacitor C1 by one of a plurality of control signals S1. Elements and operations of the second modulation channel 817 may be deduced by analogy according to descriptions of the first modulation channel 815, and it is not further described herein. In the present embodiment, the control circuit 816 outputs the plurality of control signals S1 to control the multiplexer circuits MUX1 and MUX2. The multiplexer circuits MUX1 and MUX2 select one of the voltage signals VML, VMM, VMH and GND according to the control signals S1, and thus output the selected signal to the capacitors C1 and C2, respectively.

In the present embodiment, the sensor driving circuit 820 includes a second signal modulation circuit 822, and the second signal modulation circuit 822 includes a plurality of third modulation channels 823. In the present embodiment, each of the third modulation channels 823 includes a multiplexer circuit MUX3. The multiplexer circuits MUX3 receive the voltage signals VML, VMM and VMH, and modulate the voltage signals VML, VMM and VMH on the third driving signal VCOM according to the plurality of control signals S1.

Figure 9:
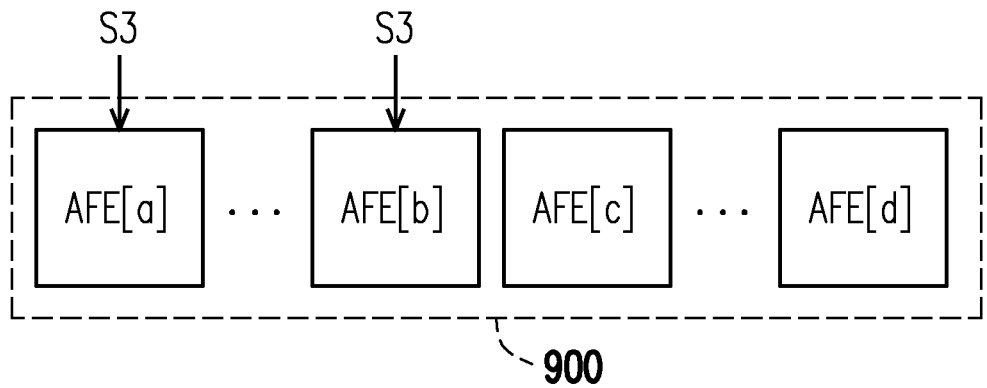
FIG. 9 illustrates a block diagram of a determination circuit according to an embodiment of the invention.

In the present embodiment, the sensor pads are grouped into active sensor pads and non-active sensor pads during the sensing period. The multiplexer circuits MUX3 coupled to the non-active sensor pads, i.e. the multiplexer circuits MUX3 located in the non-active sensing region, are controlled to sequentially transmit the voltage signals VML, VMM, VMH, GND and VCOM to the touch panel 840 by the plurality of control signals S1. The multiplexer circuits MUX3 coupled to the active sensor pads, i.e. the multiplexer circuits MUX3 located in the active sensing region, are controlled to transmit sensing signals S3 to a determination circuit 900 by the plurality of control signals S1. In the present embodiment, the determination circuit 900 may include a plurality of analog-front-end (AFE) circuits respectively denoted by AFE[a], AFE[b], AFE[c] and AFE[d], as illustrated in FIG. 9. FIG. 9 illustrates a block diagram of a determination circuit according to an embodiment of the invention. Enough teaching, suggestion, and implementation illustration for the aforesaid determination circuit and AFE circuits may be obtained with reference to common knowledge in the related art, which is not repeated hereinafter.

In the present embodiment, the waveforms of the first driving signal VGH and the second driving signal VGL are modulated to be similar to that of the third driving signal VCOM during the sensing period as illustrated in FIG. 5, and the data lines, e.g. DL depicted in FIG. 6 or FIG. 7, are controlled to be electrically floating during the sensing period. Therefore, the parasitic capacitances Csd and Cdg are effectively reduced.

Figure 10:
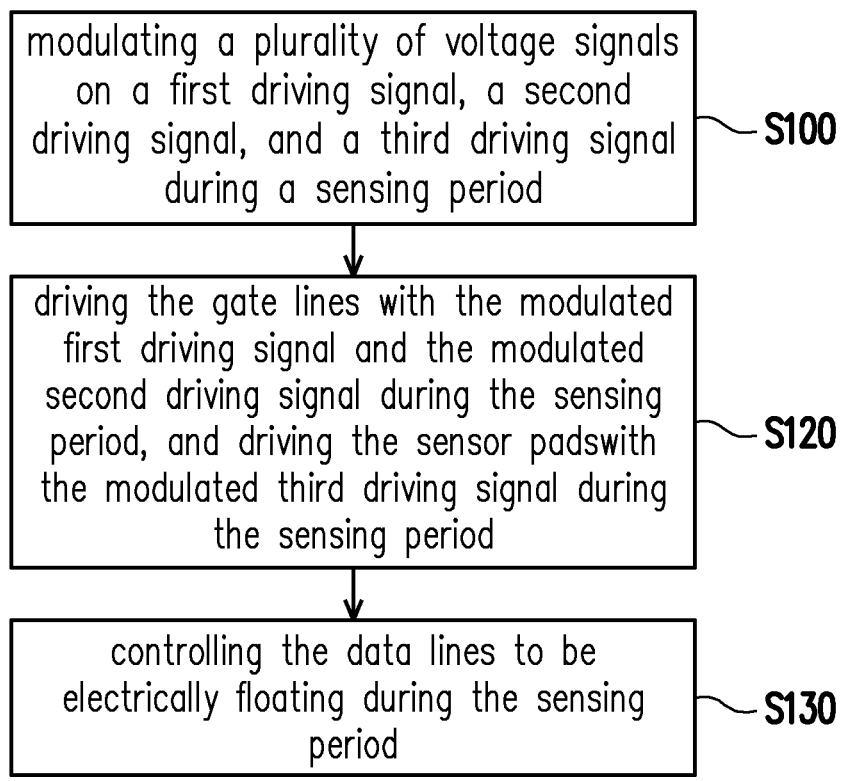
FIG. 10 is a flowchart illustrating steps in a method for driving a display panel having a touch panel according to an embodiment of the invention.

FIG. 10 is a flowchart illustrating steps in a method for driving a display panel having a touch panel according to an embodiment of the invention. Referring to FIG. 6 to FIG. 8 and FIG. 10, the method for driving the display panel having the touch panel of the present embodiment is at least adapted to one of the display touch apparatus 600 of FIG. 6, the display touch apparatus 700 of FIG. 7, and the display touch apparatus 800 of FIG. 8, but the invention is not limited thereto. Taking the display touch apparatus 800 of FIG. 8 for example, in step S100, the driving circuit 830 modulates a plurality of voltage signals VML, VMM and VMH on a first driving signal VGH, a second driving signal VGL, and a third driving signal VCOM during a sensing period. In step S110, the driving circuit 830 drives the gate lines GL with the modulated first driving signal 210 and the modulated second driving signal 220 during the sensing period, and drives the sensor pads SP with the modulated third driving signal 230 during the sensing period. In step S120, the driving circuit 830 controls the data lines DL to be electrically floating during the sensing period.

Besides, the method for driving the display panel having the touch panel described in the present embodiment of the invention is sufficiently taught, suggested, and embodied in the embodiments illustrated in FIG. 1 to FIG. 9, and therefore no further description is provided herein.

In summary, in the exemplary embodiment of the invention, the first driving signal and the second driving signal are modulated to drive the gate lines of the display panel during the sensing period, and the third driving signal is also modulated to drive the sensor pads of the touch panel. The waveforms of the modulated first driving signal, the modulated second driving signal, and the modulated third driving signal are substantially identical. The data lines of the display panel are controlled to be electrically floating during the sensing period. Therefore, the parasitic capacitances between the sensor pads and the data lines and the parasitic capacitances between the data lines and the gate lines are effectively reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A driving circuit configured to drive a display panel having a touch panel, and the driving circuit comprising:
 a signal generating circuit, configured to modulate a plurality of first voltage signals on a plurality of different first signals and provide the modulated first signals to a gate control circuit on the display panel, wherein a plurality of gate lines of the display panel are driven according to the modulated first signals during a sensing period; and
 a sensor driving circuit, configured to modulate a plurality of second voltage signals on a second signal, wherein one or more sensor pads of the touch panel are driven according to the modulated second signal during the sensing period, wherein the sensor pads comprise a plurality of active sensor pads and a plurality of non-active sensor pads during the sensing period, and the sensor driving circuit is further configured to modulate a plurality of third voltage signals on a third signal and provide the modulated third signal to the non-active sensor pads during the sensing period, wherein the sensor driving circuit comprises: a plurality of modulation channels coupled to the non-active sensor pads and to the active sensor pads, wherein the modulation channels coupled to the non-active sensor pads are controlled to sequentially transmit the third voltage signals to the touch panel, and wherein the modulation channels coupled to the active sensor pads are controlled to transmit sensing signals to a determination circuit.

2. The driving circuit according to claim 1, wherein waveforms of the modulated first signals, the modulated second signal, and the modulated third signal are substantially identical.

3. The driving circuit according to claim 2, wherein at least two of the voltage levels of the modulated first signals, the modulated second signal, and the modulated third signal are substantially different.

4. The driving circuit according to claim 1, wherein the signal generating circuit comprises:
a gate driver circuit, coupled to the gate lines, and driving the gate lines according to the modulated first signals during the sensing period; and
a signal modulation circuit, coupled to the gate driver circuit, receiving the first voltage signals, and modulating the first voltage signals on the first signals.

5. The driving circuit according to claim 4, wherein the modulated first signals are applied to a plurality of power lines of a buffer circuit of the gate driver circuit.

6. A method for driving a display panel having a touch panel, wherein the display panel comprises a plurality of gate lines, the touch panel comprises a plurality of sensor pads, and the method comprising:
modulating a plurality of first voltage signals on a plurality of different first signals and providing the modulated first signals to a gate control circuit on the display panel;
modulating a plurality of second voltage signals on a second signal, wherein the sensor pads comprise a plurality of active sensor pads and a plurality of non-active sensor pads during the sensing period;
modulating a plurality of third voltage signals on a third signal and providing the modulated third signal to the non-active sensor pads during the sensing period;
driving the gate lines according to the modulated first signals and driving the sensor pads according to the modulated second driving signal during the sensing period;
causing a plurality of first modulation channels coupled to the non-active sensor pads to sequentially transmit the third voltage signals to the touch panel; and
causing a plurality of second modulation channels coupled to the active sensor pads to transmit sensing signals to a determination circuit.

7. The method according to claim 6, wherein waveforms of the modulated first signals, the modulated second signal, and the modulated third signal are substantially identical.

8. The method according to claim 6, wherein at least two of the voltage levels of the modulated first signals, the modulated second signal, and the modulated third signal are substantially different.

9. The method according to claim 6, further comprising:
applying the modulated first signals to a plurality of power lines of a buffer circuit of a gate driver circuit.

10. A display apparatus, comprising:
a display panel, comprising a touch panel, wherein the display panel comprises a gate control circuit and a plurality of gate lines, the touch panel comprises a plurality of sensor pads and the sensor pads comprise a plurality of active sensor pads and a plurality of non-active sensor pads during a sensing period; and
a driving circuit, configured to drive the display panel having a touch panel and further configured to:
modulate a plurality of first voltage signals on a plurality of different first signals and provide the modulated first signals to the gate control circuit on the display panel, wherein a plurality of gate lines of the display panel are driven according to the modulated first signals during a sensing period;
modulate a plurality of second voltage signals on a second signal, wherein the sensor pads of the touch panel are driven according to the modulated second signal during the sensing period;
modulate a plurality of third voltage signals on a third signal and provide the modulated third signal to the non-active sensor pads during the sensing period;
cause a plurality of first modulation channels coupled to the non-active sensor pads to sequentially transmit the third voltage signals to the touch panel; and
cause a plurality of second modulation channels coupled to the active sensor pads to transmit sensing signals to a determination circuit.

11. The display apparatus according to claim 10, wherein the driving circuit comprises:
a signal generating circuit, configured to modulate the first voltage signals on the first signals and provide the modulated first signals to the gate control circuit on the display panel; and
a sensor driving circuit, configured to modulate the second voltage signals on the second signal and modulate the third voltage signals on the third signal and further configured to provide the modulated third signal to the non-active sensor pads during the sensing period.

12. The display apparatus according to claim 11, wherein waveforms of the modulated first signals, the modulated second signal, and the modulated third signal are substantially identical.

13. The display apparatus according to claim 11, wherein at least two of the voltage levels of the modulated first signals, the modulated second signal, and the modulated third signal are substantially different.

14. The display apparatus according to claim 11, wherein the signal generating circuit comprises:
a gate driver circuit, coupled to the gate lines, and driving the gate lines according to the modulated first signals during the sensing period; and
a signal modulation circuit, coupled to the gate driver circuit, receiving the first voltage signals, and modulating the first voltage signals on the first signals.

15. The display apparatus according to claim 14, wherein the modulated first signals are applied to a plurality of power lines of a buffer circuit of the gate driver circuit.

* * * * *